United States Patent
Schwartz et al.

(10) Patent No.: US 10,346,458 B2
(45) Date of Patent: Jul. 9, 2019

(54) MEDIA ASSET ACCESS CONTROL SYSTEM

(71) Applicant: Amazon Technologies, Inc., Seattle, WA (US)

(72) Inventors: Benjamin Aldouby Schwartz, Portland, OR (US); Jeremiah Dunham, Seattle, WA (US); Andrew Tunall, Portland, OR (US); Jason LaPier, Portland, OR (US); Dustin Encelewski, Happy Valley, OR (US); Justin Abrahms, Portland, OR (US); Khawaja Shams, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 211 days.

(21) Appl. No.: 15/275,020

(22) Filed: Sep. 23, 2016

(65) Prior Publication Data

US 2018/0091514 A1  Mar. 29, 2018

(51) Int. Cl.
G06F 16/48  (2019.01)
G06F 16/438  (2019.01)
G06F 16/951  (2019.01)

(52) U.S. Cl.
CPC .......... *G06F 16/438* (2019.01); *G06F 16/48* (2019.01); *G06F 16/951* (2019.01)

(58) Field of Classification Search
None
See application file for complete search history.

(56) References Cited

U.S. PATENT DOCUMENTS

| | | | |
|---|---|---|---|
| 8,001,096 B2 | 8/2011 | Farber et al. | |
| 8,447,762 B2 | 5/2013 | Brendel | |
| 8,600,998 B1 | 12/2013 | Chaudhary et al. | |
| 8,886,901 B1 * | 11/2014 | Hsu | G06F 3/0647 711/161 |
| 2003/0135576 A1 | 7/2003 | Bodin | |
| 2007/0050467 A1 * | 3/2007 | Borrett | G06F 17/30011 709/213 |
| 2008/0208961 A1 | 8/2008 | Kim et al. | |
| 2012/0185435 A1 | 7/2012 | Misra et al. | |
| 2014/0143543 A1 * | 5/2014 | Aikas | H04L 67/1097 713/168 |
| 2015/0135300 A1 * | 5/2015 | Ford | H04L 67/1097 726/11 |

(Continued)

OTHER PUBLICATIONS

International Search Report and Written Opinion in PCT/US2017/052797 dated Nov. 7, 2017.

*Primary Examiner* — Fatoumata Traore
(74) *Attorney, Agent, or Firm* — Knobbe Martens Olson & Bear LLP (57) ABSTRACT

An asset storage server is provided herein that assigns related files to an asset name and assigns permissions to the asset name such that related files with unrelated names can be assigned permissions independent of the file naming convention and without requiring a user to individually set the permissions of each file. The asset storage server may also generate modified versions of original file names and index a distributed object store based on the modified versions such that related files with related names are not listed in the same partition of the distributed object store. Indexing the distributed object store based on the modified versions of the original file names may reduce data retrieval latency.

20 Claims, 7 Drawing Sheets

(56) References Cited

U.S. PATENT DOCUMENTS

| | | |
|---|---|---|
| 2015/0227535 A1 | 8/2015 | Avati et al. |
| 2017/0180394 A1 | 6/2017 | Crofton et al. |
| 2017/0235749 A1 | 8/2017 | Beaverson et al. |
| 2018/0089183 A1 | 3/2018 | Schwartz et al. |

* cited by examiner

MEDIA ASSET ACCESS CONTROL SYSTEM

BACKGROUND

Generally, file systems store a variety of files in directories, folders, and sub-folders. A user that has access to the file system can read, write, delete, or otherwise manage such files. In some cases, it may be desirable to have the ability to set permissions for one or more files. For example, multiple users may have access to the same file system. A first user may have created a first file and may desire that other users that have access to the file system cannot read, write, or delete the first file. Thus, the first user can access the properties of the first file and set the appropriate permissions.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

As described above, a user can set file permissions to allow certain users to access a file and to disallow other users from accessing the file. In some cases, a group of files are related. For example, a media player can output a digital copy of media (e.g., a movie, television show, music video, etc.). The digital copy of media, however, may include a variety of files that are accessed sequentially to output the media. Because the files are related, it may be desirable that all of the related files have the same file permissions.

A distributed object store may store a path identifying a location where a file (e.g., a data object) is stored on disk. In particular, the distributed object store may store the paths for multiple sets of related files. In the distributed object store, files may be identified as being related based on the file names. For example, a first set of related files may be named "movie1file1," "movie1file2," "movie1file3," and so on, and a second set of related files may be named "movie2file1," "movie2file2," movie2file3," and so on. When related files have related names, changing file permissions for the related files may be relatively straightforward. For example, a batch operation can be run to change the permissions for all files that have the same prefix in the file name (e.g., "movie1*").

However, if related files do not have related names, changing file permissions can be difficult and/or expensive. For example, if related files have unrelated names, it may not be possible to define a batch operation that would capture all of the related files. An administrator may have to manually parse through the stored files, identify which files are related, and individually set the permissions for each of the related files. This can be especially tedious if the number of related files is in the thousands, hundreds of thousands, millions, etc. If a related file is missed (e.g., by an operation to change file permissions of related files, by an administrator, etc.), this may compromise file security as the missed related file could be accessed by unauthorized users. In addition, if related files have unrelated names, it may not be possible to run high level language policies, such as "All files related to this specific media asset should not be readable to any user" or "All 1080p renditions of any media asset should be readable to every user on Jan. 1, 2016."

Furthermore, if related files have related names, additional issues may surface. For example, the distributed object store may have multiple partitions and be indexed using the file names. The indexing may be based on a tree structure that has a root node, various levels of child nodes, and leaf nodes that each represent a partition of the distributed object store such that the first character of the file name determines which child node of the root node the file is assigned to, the second character of the file name determines which child node of the assigned child node the file is assigned to, and so on until the file is assigned to a leaf node (e.g., a partition of the distributed object store). In other words, files with related names may be listed together in the same partition of the distributed object store (e.g., file "movie1file2" is listed in the same partition as file "movie1file1," whereas file "game1file1" may be listed in another partition of the distributed object store). A user device may query the distributed object store to identify the location of various files the user device is attempting to retrieve. Often, the user device is attempting to retrieve related files in quick succession (e.g., because a user is viewing a movie). Because the distributed object store may be indexed using the files names and because the user device is attempting to retrieve related files with related names, the user device may be attempting to read from and/or write to the same partition of the distributed object store. Thus, there may be an uneven distribution of read and/or write traffic among the partitions of the distributed object store, thereby causing the distributed object store to become a performance bottleneck.

Accordingly, described herein is an asset storage server that (1) assigns related files to an asset name and assigns permissions to the asset name such that related files with unrelated names can be assigned permissions independent of the file naming convention and without requiring a user to individually set the permissions of each file; and/or (2) indexes the distributed object store based on a modified version of the given file names such that related files with related names are not listed in the same partition of the distributed object store. For example, when an asset owner provides a set of related files for storage in an asset database, the asset storage server may allow the asset owner to create an asset name that defines the related files (e.g., if the related files are for playing a movie, the asset name may be the name of the movie). The asset storage server may map the related files to the asset name and store the mappings in an asset permissions database.

Furthermore, the asset storage server can allow the asset owner to assign permissions to the asset name and the asset storage server can store the assigned permissions in the asset permissions database. Thus, when a user requests a file from an asset retrieval server, the asset retrieval server can (1) query the asset permissions database to identify the asset name mapped to the file; (2) use the identified asset name to determine whether the user is authorized to access the file; (3) determine a location of the file by querying the distributed object store if the user is authorized to access the file; (4) retrieve the file from the determined location; and (5) transmit the file to the user to satisfy the request.

In addition, the asset storage server can generate a hash for each related file. For example, the hash may be based on the file path of the respective related file. The generated hash may be appended as a prefix to the file name of the respective related file. Even though related files may have related names and/or may be stored in similar locations, the generated hash values for the related files may be different (e.g., the first character of the hash value for a first related file may be different than the first character of the hash value for a second related file). Thus, because the distributed object store is indexed via a tree structure, related files may be slotted into different partitions. This may reduce the likelihood that successive read and/or write requests are sent to the same partition of the distributed object store. Distributed object store data retrieval latency may therefore decrease. Additional details of the asset storage server are described below with respect to FIGS. 1-7.

Example Asset Storage Environment

Figure 1:
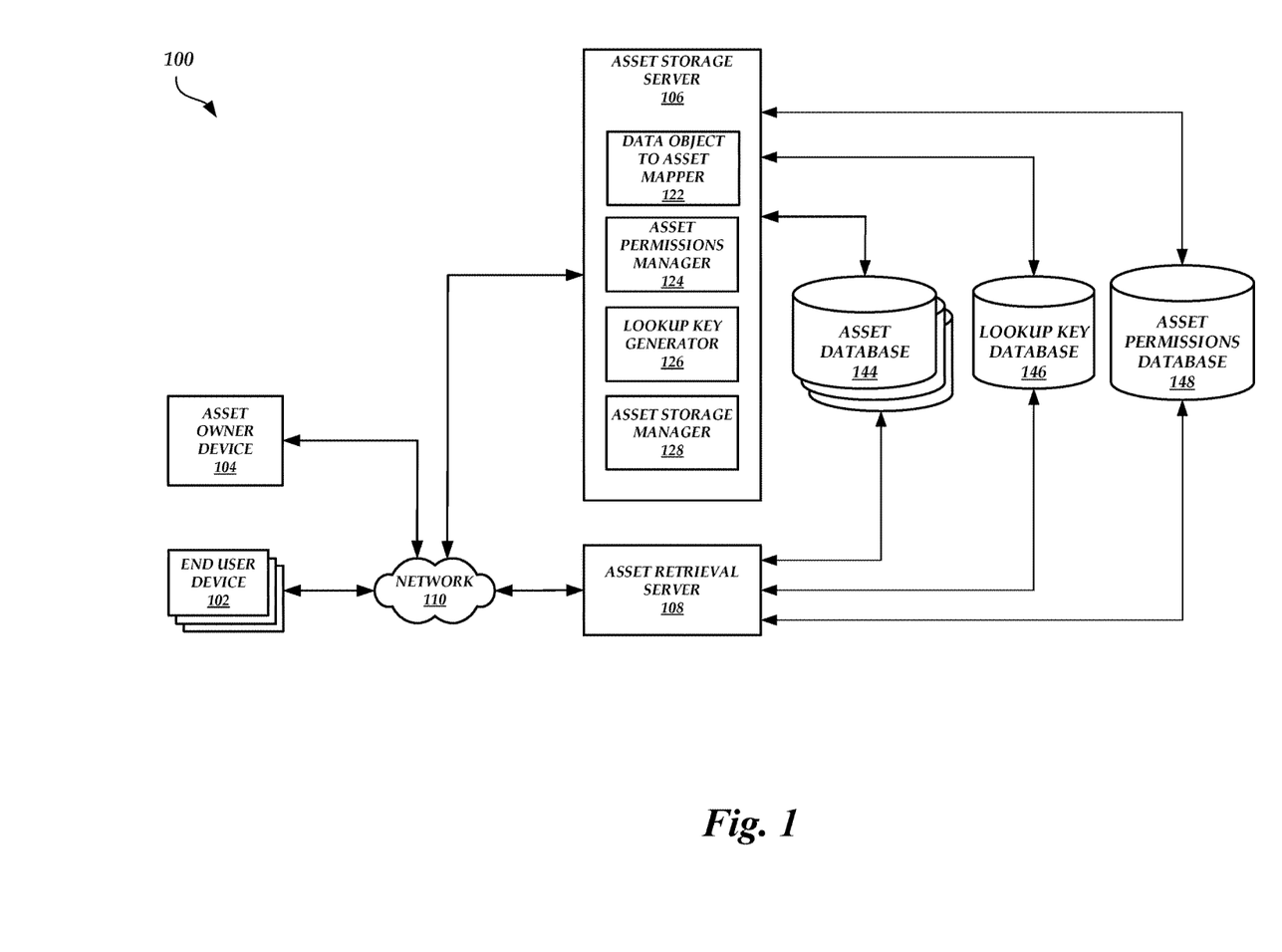
FIG. 1 is a block diagram of an asset storage environment 100, according to one embodiment.

FIG. 1 is a block diagram of an asset storage environment 100, according to one embodiment. As illustrated in FIG. 1, the asset storage environment 100 includes end user devices 102, an asset owner device 104, an asset storage server 106, an asset retrieval server 108, an asset database 144, a lookup key database 146, and an asset permissions database 148. In an embodiment, the end user devices 102 are in communication with the asset retrieval server 108 via a network 110. In addition, the asset owner device 104 can be in communication with the asset storage server 106 via the network 110. The network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

The asset database 144 may store data objects (e.g., files) that relate to a variety of different content, such as movies, television shows, music videos, audio books, and/or the like. Furthermore, the asset database 144 may store different versions of the same content. For example, the asset database may store content in different formats (e.g., 480i, 720p, 1080p, 4K, etc.), content in different languages (e.g., English, French, Spanish, etc.), content with bonus features (e.g., director commentary, deleted scenes, etc.), and/or the like. Data objects may be stored in various folders or directories within the asset database 144. However, as described herein, the actual location in the asset database 144 where data objects are stored may not affect the application of modification of permissions assigned to the data objects. The asset database 144 may have several tiers of storage, such as primary storage, archive storage, and/or the like. Primary storage may provide faster retrieval times than archive storage and therefore may be more expensive to offer and maintain than archive storage.

Content may not be stored in a single data object. Rather, content may be stored in a plurality of data objects that each represent a small time slice of the overall content. The plurality of data objects can be accessed in succession to output the content. The data objects in the plurality may therefore be related. An asset owner via the asset owner device 104 may indicate to the asset storage server 106 that a plurality of related data objects is being transmitted to the asset database 144 for storage. For example, the plurality of related data objects may be transmitted to the asset database 144 for storage via the asset storage server 106, the asset retrieval server 108, or another system (not shown). The asset owner device 104 may also indicate to which asset or sub-asset the plurality of related data objects should be associated. As used herein, an asset may refer to a specific content title (e.g., a movie, television show, music video, audio book, etc.) and a sub-asset may refer to a specific version or format of an asset (e.g., content in the 1080p format, content in French, content that is capable of being distributed over a specific distribution channel like television, the Internet, and cellular networks, etc.) or a different rendition of an asset (e.g., an episode of a television show).

The asset storage server 106 may include a data object to asset mapper 122, an asset permissions manager 124, a lookup key generator 126, and an asset storage manager 128. The data object to asset mapper 122 may be configured to map data objects to asset or sub-asset names. For example, the data object to asset mapper 122 may receive the indicated asset or sub-asset name from the asset owner device 104 and generate a mapping of the asset or sub-asset name to each of the related data objects. The data object to asset mapper 122 may then store the mappings in the asset permissions database 148.

In addition, the asset owner device 104 may indicate permissions to be assigned to the asset or sub-asset name. For example, permissions can include read access, write access, update access, delete access, update metadata access (e.g., authorization to modify attributes of a data object, such as format, bitrate, keywords, associated actors, date of creation, date of filming, etc.), and/or the like and may specify which end users are associated with the permissions. As an example, an end user may be a user (e.g., a licensee, a consumer, a rights holder, etc.) that has been granted permission to access certain data objects for viewing. In some embodiments, multiple permissions are assigned to the asset or sub-asset name. For example, a first end user may be granted read access to the data objects mapped to an asset or sub-asset name and a second end user may be granted read and write access to the data objects mapped to the asset or sub-asset name. The asset permissions manager 124 can receive the permissions indicated by the asset owner device 104 and map the permissions to the indicated asset or sub-asset name. The asset permissions manager 124 may then store the mapping in the asset permissions database 148. Thus, the asset permissions database 148 may store a mapping of an asset or sub-asset name to a plurality of data objects and a mapping of an asset or sub-asset name to one or more permissions. The contents of the asset permissions database 148 are described in greater detail below with respect to FIG. 3.

Alternatively, the asset owner device 104 may not indicate permissions that should be assigned to the asset or sub-asset name. In such a situation, the asset permissions manager 124 assigns default permissions to the asset or sub-asset name and the mapping of the default permissions to the asset or sub-asset name is stored in the asset permissions database 148.

The asset permissions manager 124 may be further configured to apply permissions to asset or sub-asset names in response to received requests. For example, the asset owner device 104 can transmit a request (e.g., an application programming interface (API) call) to add or modify permissions of one of more asset names or sub-asset names. The request may identify the asset or sub-asset name(s) and include information detailing the new permissions. The asset permissions manager 124 can use the identified asset or sub-asset name(s) and the permissions information to modify the permissions of the asset or sub-asset name(s) stored in the asset permissions database 148 (e.g., update the mapping of asset to permissions and store the updated mapping in the asset permissions database 148).

Optionally, the request to add or modify permissions of one or more asset names or sub-asset names includes a time parameter. With the time parameter, an asset owner can specify a date and/or time that the permissions expire. Upon expiration of the requested permissions, the permissions of an asset or sub-asset name may revert back to previous permissions, may change to default permissions, or permissions may no longer be mapped to the asset or sub-asset name.

The asset permissions manager 124 can also automatically run rules that apply permissions to select asset or sub-asset names. For example, a rule may define an action to run (e.g., adding or modifying permissions of an asset or sub-asset name) when an event occurs or at set times (e.g., periodically). A rule may apply to assets or sub-assets based on the name of the asset or sub-asset (e.g., the name provided by the asset owner device 104). In addition, a rule may apply to data objects, either data objects that are mapped to the same asset or sub-asset name or data objects that are mapped to different asset or sub-asset names. For example, a rule can apply to data objects based on the format of the data objects (e.g., resolution, file size, bitrate, play length, etc.). Events can include an introduction of a new asset or sub-asset name, an expiration of existing permissions, an addition, modification, and/or deletion of one or more data objects stored in the asset database 144, and/or the like. Execution of a rule can result in the asset permissions manager 124 updating a mapping of asset or sub-asset name to permissions and storing the updated mapping in the asset permissions database 148.

The lookup key database 146 may store a mapping between a name of a data object and a location in the asset database 144 where the data object is stored. As described above, a distributed object store may have multiple partitions and be indexed using the data object names. As illustrated in FIG. 1, the lookup key database 146 is a distributed object store. Thus, the lookup key database 146 may have multiple partitions and be indexed using the names of the data objects stored in the asset database 144. Given that related data objects with related names can cause the performance bottleneck issues described above, the lookup key generator 126 can generate modified data object names that result in varied name prefixes and create a mapping between data object names originally provided by an asset owner and the modified data object names. Thus, to the asset owner, the names of the data objects remain unchanged. However, for the purposes of the lookup key database 146, the lookup key database 146 is instead indexed based on the varied modified data object names.

For example, the lookup key generator 126 can be configured to generate a hash for each data object stored in the asset database 144. The hash can be generated using any known techniques, such as SHA-256. The lookup key generator 126 may determine the hash using at least a portion of the file path of the respective data object (e.g., the file path of the data object that identifies a location of the data object in the asset database 144, including asset name, sub-asset name, data object name, folder, sub-folder, sub-directory, directory, partition, etc.). Once a hash is generated, the lookup key generator 126 can append the generated hash as a prefix to the original name of the data object given by the asset owner to form the modified data object name. For example, if a data object is named "movie1file1" and a hash of the file path of the data object is "7HG9," then the modified data object name may be "7HG9movie1file1." Even though related data objects may have related names and/or may be stored in similar locations in the asset database 144, the generated hash values for the related data objects may be different (e.g., the first character of the hash value for a first related data object may be different than the first character of the hash value for a second related data object). In fact, the hash values may be generated such that collisions (e.g., two successive or nearly successive (e.g., requests within 2 requests of each other) read requests are made to the same partition) are greatly reduced. Thus, because the lookup key database 146 is indexed via a tree structure, related data objects may then be slotted into different partitions based on the modified data object names. This may reduce the likelihood that successive read and/or write requests are sent to the same partition of the lookup key database 146 by the asset retrieval server 108 or another device. Lookup key database 146 data retrieval latency may therefore decrease.

Alternatively, the lookup key generator 126 can generate the modified data object names using other techniques. For example, instead of generating a hash value and appending the hash value to the original data object name, the lookup key generator 126 can reverse the order of the characters in the original data object name. As another example, the lookup key generator 126 can generate unique identifiers that are not based on the file path of the data object and replace the original data object names with the unique identifiers. As another example, the lookup generator 126 can randomly reorder characters in the original data object name (e.g., where the reordering is randomly determined for each data object) and use the reordered characters as the modified data object name. The lookup key generator 126 may use other techniques, not described, to generate the modified data object names in a manner that causes related data objects with related data object names to have an early enough difference in the modified name such that lookups of these related data objects in the lookup key database 146 are randomized across the different partitions of the lookup key database 146.

The lookup key generator 126 may store the mappings between the original data object names and the modified data object names in a table in the lookup key database 146. The lookup key generator 126 may also store the generated modified data object names in relation to the locations of the corresponding data objects in the lookup key database 146 such that the lookup key database 146 is indexed using the generated modified data object names.

While the lookup key database 146 may be indexed based on the generated modified data object names, the indexing may be transparent to users. For example, the generation of the modified data object name may not affect the asset owner's data object naming convention. The asset owner can continue to store data objects in folders, sub-folders, directories, etc. in the asset database 144 using names chosen by the asset owner. The use of the modified data object names may not change the file structure or the manner in which data objects are organized and stored in the asset database 144. Rather, the modified data object names may merely control which partitions of the lookup key database 146 are accessed when data objects are requested from the asset database 144. An illustrative example of the lookup key database 146 is described below with respect to FIG. 2.

The asset storage manager 128 may be configured to store data objects in the asset database 144 that are received from the asset owner device 104. The asset storage manager 128 may further be configured to perform batch operations on data objects stored in the asset database 144. For example, an asset owner device 104 can transmit a request (e.g., an API call) for a list of asset or sub-asset names that are mapped to data objects that a particular end user has permission to access (e.g., read, write, update, etc.). The asset storage manager 128 can query the asset permissions database 148 for the list of asset or sub-asset names and forward the list to the asset owner device 104 for display and/or storage. Alternatively, the asset permissions manager 124 may retrieve and send the list to the asset owner device 104. As another example, the asset storage manager 128 can receive a request (e.g., an API call) from the asset owner device 104 to move data objects mapped to an asset or sub-asset name from one storage tier to another storage tier. In response to the request, the asset storage manager 128 can query the asset permissions database 148 to identify data objects mapped to the asset or sub-asset name, query the lookup key database 146 to identify locations of the identified data objects, retrieve the identified data objects from the specified locations in the asset database 144, and re-store the identified data objects in the new storage tier of the asset database 144.

As described above, related data objects may be stored in the same folders or directories in the asset database 144. However, the permission mapping using asset or sub-asset names described herein is different than a conventional system that allows a user to modify permissions of a folder (which are then applied to all data objects in the folder) because often related data objects stored in the same folder require different access rights. As an illustrative example, a folder in the asset database 144 may store a first data object related to a first asset and a second data object related to the first asset. The first data object may be a 720p version of the first asset and the second data object may be a 1080p version of the first asset. A first end user may be assigned permissions that grant the first end user read access to the 720p and 1080p versions of the first asset. A second end user may be assigned permissions that grant the second end user read access to 720p versions of the first asset and other assets, but no access to 1080p versions of any access. Without the techniques implemented by the asset storage server 106 described herein, it may not be possible to run a batch operation to assign permissions to the first end user and the second end user in a manner as described above. Additional folders may have to be created to further subdivide the data objects, causing increased asset database 144 retrieval latency due to the additional read and write requests necessary to create the additional folders or directories and due to the additional query time required to identify the location of a desired data object given the additional folders or directories. The techniques implemented by the asset storage server 106 described herein may reduce the proliferation of folders, thereby reducing asset database 144 retrieval latency and allowing for the ability to run batch operations as described herein.

An end user device 102 can request access to one or more data objects via the asset retrieval server 108. For example, the end user device 102 can transmit a request (e.g., an API call) to the asset retrieval server 108 to access a first data object. The request can indicate whether the requested access is read access, write access, update access, delete access, update metadata access, and/or the like. The asset retrieval server 108 can query the asset permissions database 148 to identify an asset or sub-asset mapped to the first data object. Once the mapped asset or sub-asset is determined, the asset retrieval server 108 can query the asset permissions database 148 to determine whether a user associated with the end user device 102 (or the end user device 102 itself) has permission to access the mapped asset or sub-asset in the manner requested.

If the user or end user device 102 does not have permission to access the asset or sub-asset, then the asset retrieval server 108 may transmit a notification to the end user device 102 indicating that access is denied. Otherwise, if the user or end user device 102 does have permission to access the asset or sub-asset, then the asset retrieval server 108 can query the lookup key database 146 to identify the location of the first data object in the asset database 144. For example, the asset retrieval server 108 may first query the table in the lookup key database 146 that maps original data object names to modified data object names to identify the modified data object name corresponding to the name of the first data object. The asset retrieval server 108 may then query the lookup key database 146 using the modified data object name to identify the file path of the first data object. Alternatively, a query by the asset retrieval server 108 may cause the lookup key database 146 to identify a modified data object name that corresponds to the first data object name (e.g., as stored in a table in the lookup key database 146) and respond to the asset retrieval server 108 with the file path corresponding to the modified data object name.

Using the received file path, the asset retrieval server 108 can retrieve the first data object from the asset database 144 and transmit the first data object to the end user device 102 to satisfy the request. The asset retrieval server 108 can repeat this process for any number of requested data objects and any number of end user devices 102.

The end user devices 102 and the asset owner device 104 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual end user devices 102 may execute a browser application or a stand-alone application that allows a user to request specific data objects from the asset retrieval server 108. Likewise, the asset owner device 104 may execute a browser application or a standalone application that allows an asset owner to add or modify permissions and/or to manage the storage of data objects.

The asset storage server 106 can be a computing system programmed or otherwise configured to manage permissions and data object storage as described herein. The asset storage server 106 may add or change permissions on request, automatically when events occur, when data objects are stored in the asset database 144, when data objects stored in the asset database 144 are modified, and/or any combination thereof.

The asset storage server 106 and/or the asset retrieval server 108 of FIG. 1 may be a single computing device or may include multiple distinct computing devices, such as computer servers, logically or physically grouped together to collectively operate as a server system. The components of the asset storage server 106 and/or the asset retrieval server 108 can each be implemented in application-specific hardware (e.g., a server computing device with one or more ASICs) such that no software is necessary, or as a combination of hardware and software. In addition, the modules and components of the asset storage server 106 and/or the asset retrieval server 108 can be combined on one server computing device or separated individually or into groups on several server computing devices. In some embodiments, the asset storage server 106 and/or the asset retrieval server 108 may include additional or fewer components than illustrated in FIG. 1.

In some embodiments, the features and services provided by the asset storage server 106 and/or the asset retrieval server 108 may be implemented as web services consumable via the communication network 110. In further embodiments, the asset storage server 106 and/or the asset retrieval server 108 are provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The asset database 144, the lookup key database 146, and/or the asset permissions database 148 may be located external to the asset storage server 106 and/or the asset retrieval server 108. For example, the asset database 144, the lookup key database 146, and/or the asset permissions database 148 may be stored and managed by a separate system or server and may be in communication with the asset storage server 106 and/or the asset retrieval server 108 via a direct connection or an indirect connection (e.g., via a network, such as the network 110). In other embodiments, not shown, the asset database 144, the lookup key database 146, and/or the asset permissions database 148 are located within the asset storage server 106 or the asset retrieval server 108.

Example Tables in Lookup Key Database

Figure 2:
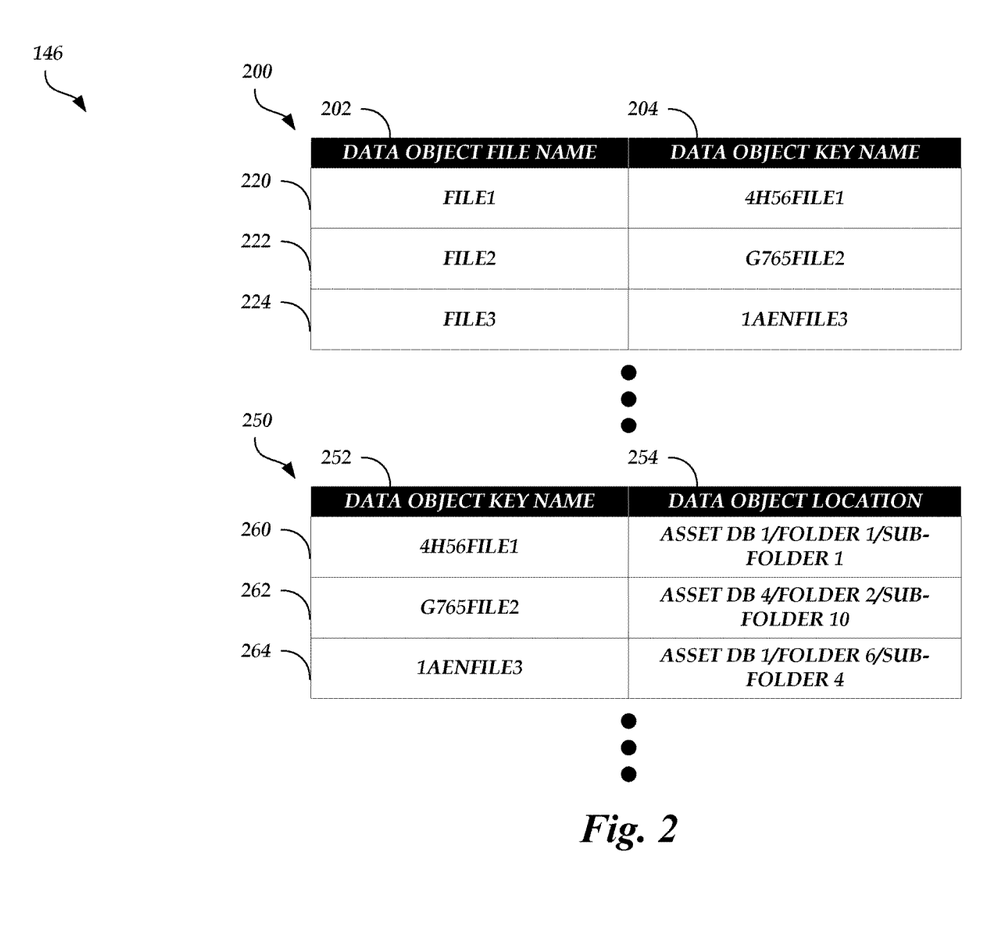
FIG. 2 illustrates exemplary tables stored in the lookup key database of FIG. 1, according to one embodiment

FIG. 2 illustrates an exemplary table 200 and an exemplary table 250 stored in the lookup key database 146 of FIG. 1, according to one embodiment. As illustrated in FIG. 2, the table 200 is a table that stores a relationship between original data object names and modified data object names. For example, the table 200 may include a data object file name header 202, which lists original data object names, and a data object key name header 204, which lists modified data object names. Rows 220, 222, and 224 may depict entries in the table 200 for various data objects. As illustrated in table 200, original data object names may be "FILE1," "FILE2," and "FILE3." In some embodiments, "FILE1," "FILE2," and "FILE3" may be the names of data objects that are mapped to the same asset or sub-asset. As described above, the lookup key generator 126 can generate hash values to append as prefixes to original data object names. Thus, modified data object names may be "4H56FILE1," "G765FILE2," and "1AENFILE3," where "4H56," "G765," and "1AEN" are the appended hash values.

Table 250 may be a table that stores a relationship between modified data object names and file paths in the asset database 144. For example, the table 250 may include a data object key name header 252, which lists modified data object names, and a data object location header 254, which lists the file path of the corresponding data object. Rows 260, 262, and 264 may depict entries in the table 250 for various data objects. While rows 260, 262, and 264 are illustrated in FIG. 2 as being contiguous, this is merely for illustrative purposes. Because each of the appended hash values begins with a different character, the modified data object names likely will fall in different partitions of the lookup key database 146. Thus, even if the asset retrieval server 108 is attempting to access "FILE1," "FILE2," and "FILE3" in succession, the read requests to the lookup key database 146 may be routed to different partitions in the lookup key database 146.

While the table 200 and the table 250 are depicted as separate tables in the lookup key database 146, this is not meant to be limiting. For example, the contents of the table 200 and the table 250 can be combined into a single table that is stored in the lookup key database 146.

Example Tables in Asset Permissions Database

Figure 3:
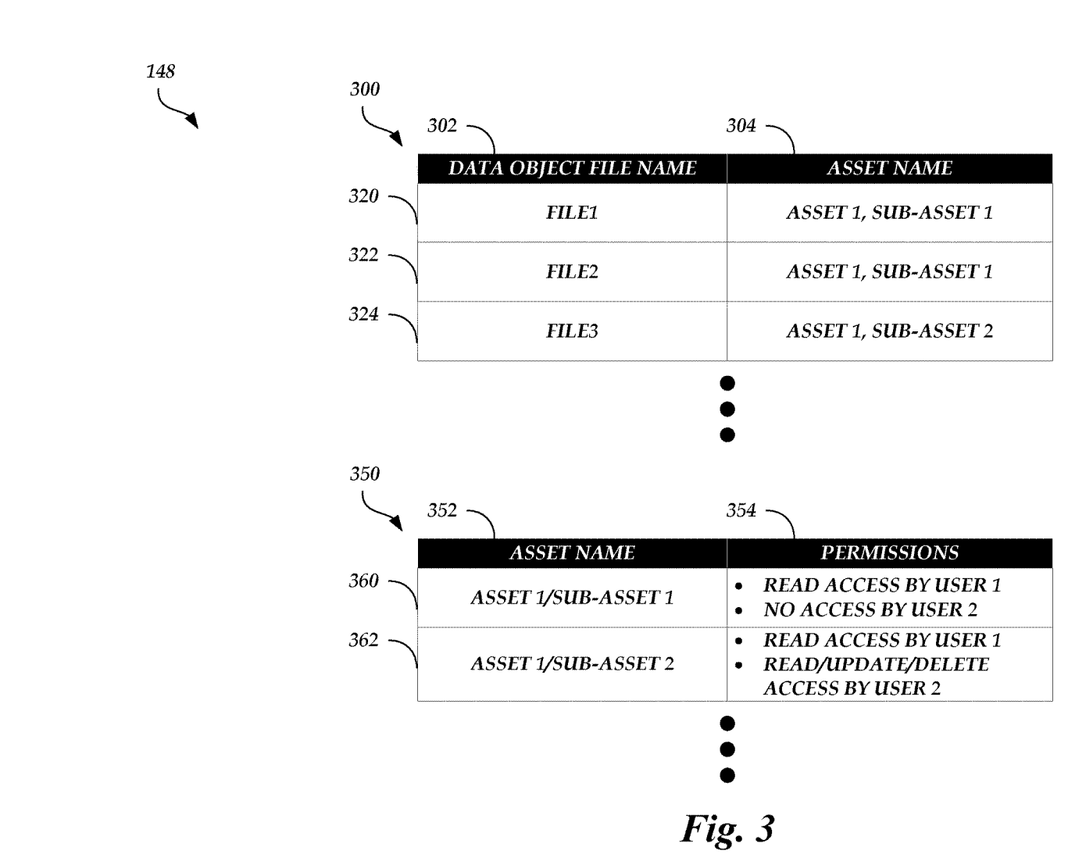
FIG. 3 illustrates exemplary tables stored in the asset permissions database of FIG. 1, according to one embodiment

FIG. 3 illustrates an exemplary table 300 and an exemplary table 350 stored in the asset permissions database 148 of FIG. 1, according to one embodiment. As illustrated in FIG. 3, the table 300 is a table that stores a relationship or mapping between original data object names and asset and/or sub-asset names. For example, the table 300 may include a data object file name header 302, which lists original data object names, and an asset name header 304, which lists mapped asset(s) and/or sub-asset(s). Rows 320, 322, and 324 may depict entries in the table 300 for various data objects. As illustrated in table 300, original data object names may be "FILE1," "FILE2," and "FILE3." Data objects "FILE1," "FILE2," and "FILE3" are each mapped to asset name "ASSET 1." However, data objects "FILE1" and "FILE2" may be mapped to sub-asset name "SUB-ASSET 1," whereas data object "FILE3" may be mapped to sub-asset name "SUB-ASSET 2." As an illustrative example, data objects "FILE1" and "FILE2" may both be mapped to the sub-asset name "SUB-ASSET 1" because both data objects, along with other data objects, may together be used to playback a particular version of an asset (e.g., a 1080p version of a movie).

Table 350 may be a table that stores a relationship or mapping between assets and/or sub-assets and permissions. For example, the table 350 may include an asset name header 352, which lists asset(s) and/or sub-asset(s), and a permissions header 354, which identifies permissions assigned to assets and/or sub-assets. Rows 360 and 362 may depict entries in the table 350 for various assets and/or sub-assets. As illustrated in table 350, the sub-asset "SUB-ASSET 1" of the asset "ASSET 1" has permissions that allow user 1 read access to data objects mapped to the sub-asset (e.g., data objects "FILE1" and "FILE2") and has permissions that allow user 2 no access to the mapped data objects. The sub-asset "SUB-ASSET 2" of the asset "ASSET 1" has different permissions than "SUB-ASSET 1," however. Sub-asset "SUB-ASSET 2" has permissions that allow user 1 read access to data objects mapped to the sub-asset (e.g., data object "FILE3") and has permissions that allow user 2 read access, update access, and delete access to the mapped data objects. Thus, multiple permissions can be assigned to a particular asset or sub-asset name and different permissions can be assigned to different sub-assets of an asset name.

While the table 300 and the table 350 are depicted as separate tables in the asset permissions database 148, this is not meant to be limiting. For example, the contents of the table 300 and the table 350 can be combined into a single table that is stored in the asset permissions database 148.

Example Block Diagram for Managing Data Objects

Figure 4:
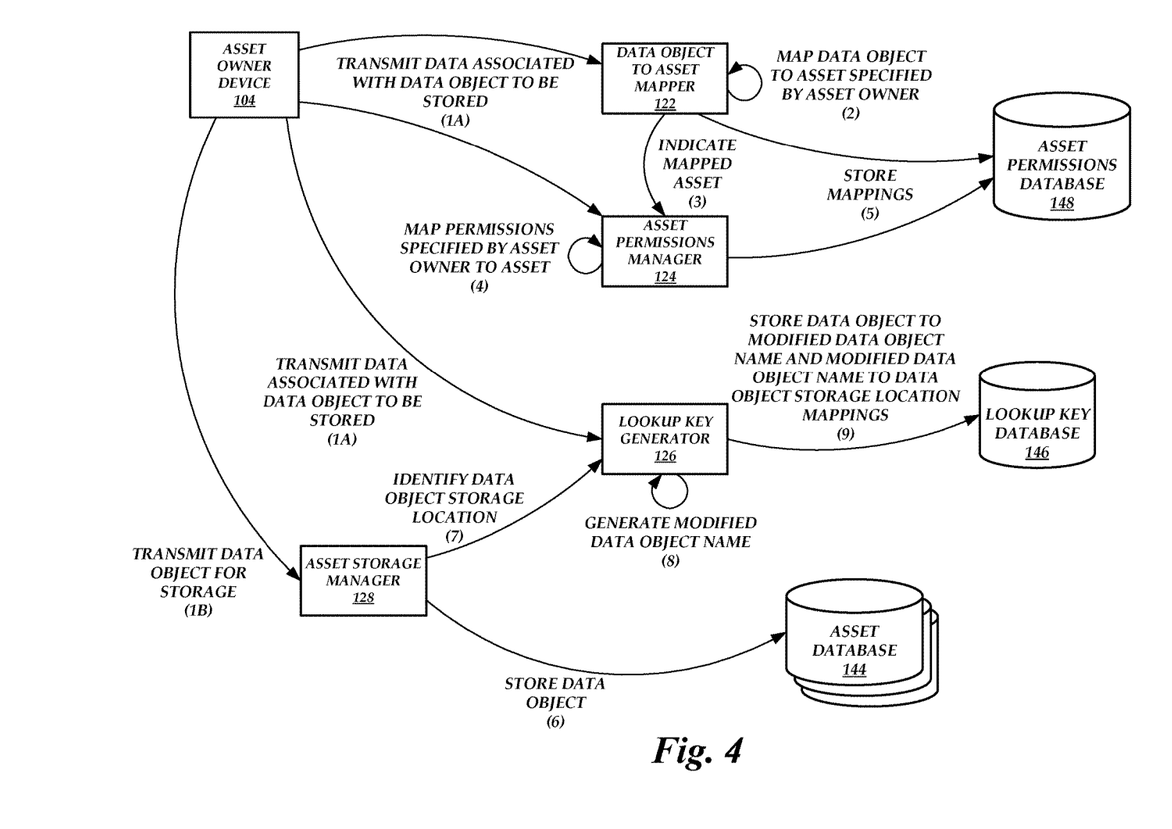
FIG. 4 is a block diagram of the asset storage environment of FIG. 1 illustrating the operations performed by the components of the asset storage environment to manage data objects, according to one embodiment.

FIG. 4 is a block diagram of the asset storage environment 100 of FIG. 1 illustrating the operations performed by the components of the asset storage environment 100 to manage data objects, according to one embodiment. As illustrated in FIG. 4, the asset owner device 104 may transmit data associated with a data object to be stored to the data object to asset mapper 122, the asset permissions manager 124, and/or the lookup key generator 126 at (1A). Data associated with the data object to be stored may include a name of the data object, an indication of an asset or sub-asset name to which the data object is associated, and/or permissions to assign the asset or sub-asset name. The data object to asset mapper 122 may map the data object to the asset or sub-asset name specified by the asset owner device 104 at (2). The data object to asset mapper 122 may then indicate to the asset permissions manager 124 that the data object is mapped to a particular asset or sub-asset name at (3). The asset permissions manager 124 can then map the permissions provided by the asset owner device 104 to the asset or sub-asset name at (4) and store the mapping in the asset permissions database 148 at (5).

Concurrently with the transmission of the data associated with the data object, before the transmission of the data associated with the data object, or after the transmission of the data associated with the data object at step (1A), the asset owner device 104 can transmit a data object to the asset storage manager 128 for storage at (1B). The asset storage manager 128 can store the data object in the asset database 144 at (6). The asset storage manager 128 can also forward an identification of the storage location (e.g., file path) of the data object to the lookup key generator 126 at (7). Alternatively, the lookup key generator 126 can determine the storage location by querying the asset database 144.

Using the identified storage location, the lookup key generator 126 can generate a modified data object name for the data object at (8). For example, the lookup key generator 126 can generate a hash using the identified storage location and append the hash as a prefix to the original name of the data object to create the modified data object name. The lookup key generator 126 can then store a mapping of the original data object name to the modified data object name and a mapping of the modified data object name and the storage location of the data object in the lookup key database 146 at (9). The modified data object name may allow for related data objects to be slotted in different partitions of the lookup key database 146. For example, as described above, the indexing of the lookup key database 146 may be based on a tree structure that has a root node, various levels of child nodes, and leaf nodes that each represents a partition of the lookup key database 146. A first character of the modified data object name may determine which child node of the root node the data object is assigned to, the second character of the modified data object name may determine which child node of the assigned child node the data object is assigned to, and so on until the data object is assigned to a leaf node (e.g., a partition of the lookup key database 146). The original data object names of related data objects may have similar names (e.g., "movie1file1," "movie1file2," "movie1file3," etc.) and therefore related data objects may be slotted into the same leaf node (e.g., partition) if the lookup key database 146 is indexed based on the original data object names. However, for related data objects, appending the hash as a prefix to the original name may result in the first character and/or subsequent characters of the modified data object names to be different. Thus, by using the modified data object names to index the lookup key database 146, related data objects may be assigned to different child nodes and/or leaf nodes, resulting in the related data objects being slotted into different partitions of the lookup key database 146. Slotting related data objects into different partitions of the lookup key database 146 may reduce data query and/or retrieval times.

While steps (6) through (9) are depicted as occurring after steps (2) through (5), this is not meant to be limiting. For example, the asset storage server 106 may perform steps (6) through (9) before steps (2) through (5).

Example Block Diagram for Accessing a Data Object

Figure 5:
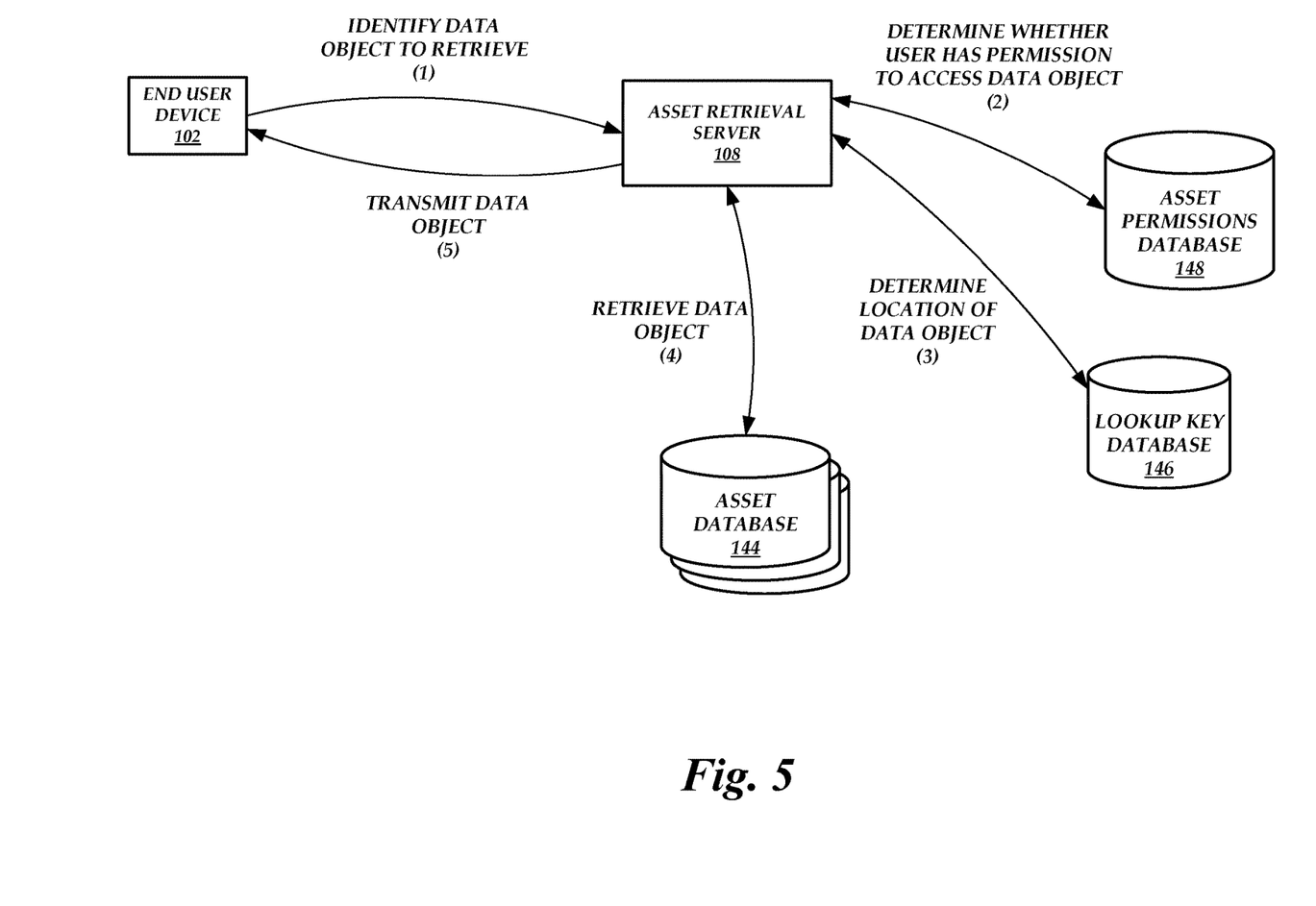
FIG. 5 is a block diagram of the asset storage environment of FIG. 1 illustrating the operations performed by the components of the asset storage environment to allow access to a data object, according to one embodiment.

FIG. 5 is a block diagram of the asset storage environment 100 of FIG. 1 illustrating the operations performed by the components of the asset storage environment 100 to allow access to a data object, according to one embodiment. As illustrated in FIG. 5, the end user device 102 transmits a request to the asset retrieval server 108 identifying a data object to retrieve at (1). In response to receiving the request, the asset retrieval server 108 queries the asset permissions database 148 to determine whether the user associated with the end user device 102 (or the end user device 102 itself) has permission to access the requested data object at (2). As described herein, the query may involve two operations. For example, the asset retrieval server 108 may query the asset permissions database 148 to identify which asset or sub-asset name is mapped to the requested data object. Once this is determined, the asset retrieval server 108 may query the asset permissions database 148 to identify the permissions associated with the mapped asset or sub-asset name. The asset retrieval server 108 can analyze the retrieved permissions to determine whether the user is authorized to access the data object. Alternatively, the asset retrieval server 108 can transmit the user or end user device 102 name and the data object name to the asset permissions database 148 and the asset permissions database 148 may analyze such data as described above with respect to the asset retrieval server 108, returning a notification indicating whether the user or end user device 102 is authorized to access the data object.

If the user or end user device 102 is not authorized to access the data object, the asset retrieval server 108 sends a notification to the end user device 102 indicating that access is denied, not shown. Otherwise, if the user or end user device 102 is authorized to access the data object, the asset retrieval server 108 determines a location of the data object by querying the lookup key database 146 at (3). For example, the lookup key database 146 may be indexed based on the modified data object names. Thus, a first table in the lookup key database 146 may be queried by the asset retrieval server 108 to determine a modified data object name that corresponds to the original name of the data object. Once this is determined, the asset retrieval server 108 can query the lookup key database 146 using the modified data object name to identify the file path of the data object stored in the asset database 144.

Once the file path of the data object stored in the asset database 144 is received, the asset retrieval server 108 can retrieve the data object from the asset database 144 at (4). The asset retrieval server 108 may then transmit the retrieved data object to the end user device 102 at (5) to satisfy the request.

Alternatively, instead of transmitting a request to the asset retrieval server 108 identifying a data object to retrieve, the end user device 102 may transmit a request to the asset retrieval server 108 identifying an asset or sub-asset to retrieve at (1). In response to receiving the request, the asset retrieval server 108 queries the asset permissions database 148 to determine whether the user associated with the end user device 102 (or the end user device 102 itself) has permission to access data objects associated with the specified asset or sub-asset name at (2). The asset retrieval server 108 can make the determination by querying the asset permissions database 148 to identify the permissions associated with the specified asset or sub-asset name. The asset retrieval server 108 can analyze the retrieved permissions to determine whether the user is authorized to access data objects associated with the asset or sub-asset name. Alternatively, the asset retrieval server 108 can transmit the user or end user device 102 name and the asset or sub-asset name to the asset permissions database 148 and the asset permissions database 148 may analyze such data as described above with respect to the asset retrieval server 108, returning a notification indicating whether the user or end user device 102 is authorized to access data objects associated with the specified asset or sub-asset name.

If the user or end user device 102 is not authorized to access data objects associated with the specified asset or sub-asset name, the asset retrieval server 108 sends a notification to the end user device 102 indicating that access is denied, not shown. Otherwise, if the user or end user device 102 is authorized to access data objects associated with the specified asset or sub-asset name, the asset retrieval server 108 may identify the data objects that are associated with the specified asset or sub-asset name. For example, the asset retrieval server 108 can query the asset permissions database 148 to identify the data objects that are mapped to the specified asset or sub-asset name. The asset retrieval server 108 can then determine a location of some or all of the mapped data objects by querying the lookup key database 146 at (3). As described above, the lookup key database 146 may be indexed based on the modified data object names. Thus, a first table in the lookup key database 146 may be queried by the asset retrieval server 108 to determine the modified data object names that correspond to the original names of the mapped data objects. Once this is determined, the asset retrieval server 108 can query the lookup key database 146 using the modified data object names to identify the file paths of the mapped data objects stored in the asset database 144.

Once the file paths of the mapped data objects stored in the asset database 144 are received, the asset retrieval server 108 can retrieve the mapped data objects from the asset database 144 at (4). The asset retrieval server 108 may then transmit the retrieved data objects (e.g., sequentially, in bursts or groups, in parallel, etc.) to the end user device 102 at (5) to satisfy the request.

Example Data Object Permission Assignment Routine

Figure 6:
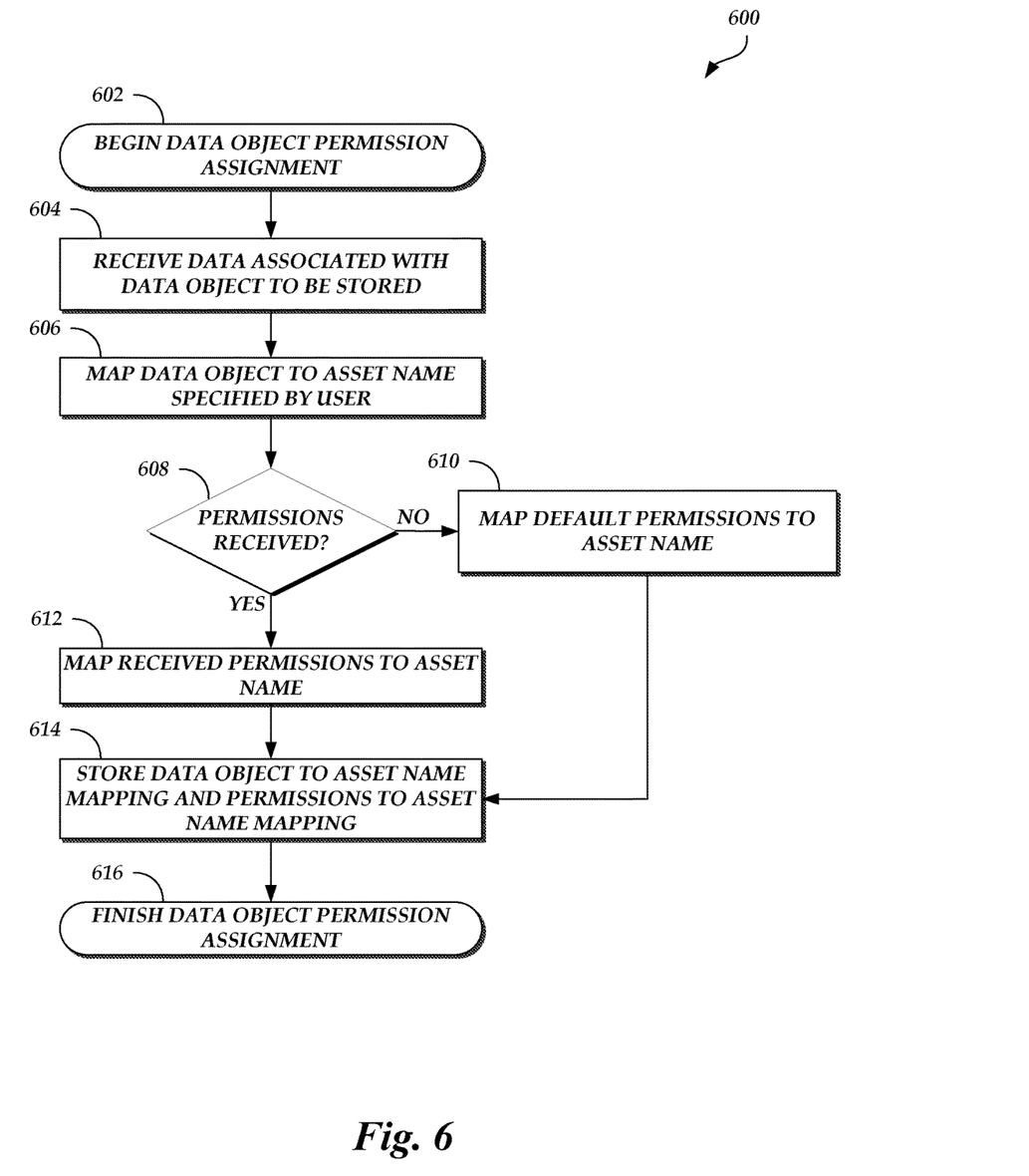
FIG. 6 is a flow diagram depicting a routine for assigning data object permissions illustratively implemented by an asset storage server, according to one embodiment.

FIG. 6 is a flow diagram depicting a data object permission assignment routine 600 illustratively implemented by an asset storage server, according to one embodiment. As an example, the asset storage server 106 of FIG. 1 can be configured to execute the data object permission assignment routine 600. The data object permission assignment routine 600 begins at block 602.

At block 604, data associated with a data object to be stored is received. For example, the data may include a name of the data object, an indication of an asset or sub-asset name to which the data object is associated, and/or permissions to assign the asset or sub-asset name.

At block 606, the data object is mapped to an asset name specified by a user. For example, multiple data objects may be mapped to the asset name.

At block 608, a determination is made as to whether permissions are received from a user. For example, received permissions may include information identifying permissions that are to be associated with the received asset name. If permissions are received, the data object permission assignment routine 600 proceeds to block 612. Otherwise, the data object permission assignment routine 600 proceeds to block 610.

At block 610, default permissions are mapped to the received asset name. For example, default permissions may be defined such that only the user that provided the data objects mapped to the asset name are allowed access to the data objects. After block 610 is complete, the data object permission assignment routine 600 proceeds to block 614.

At block 612, the received permissions are mapped to the asset name. In some embodiments, multiple permissions are mapped to the asset name, such as permissions specific to individual users.

At block 614, the data object to asset name mapping and the permissions to asset name mapping are stored. For example, the mappings may be stored in the asset permissions database 148. The mappings can then be used by the asset retrieval server 108 to satisfy requests for data objects submitted by various end user devices 102. After the mappings are stored, the data object permission assignment routine 600 may be complete, as shown in block 616.

Example Modified Data Object Name Generation Routine

Figure 7:
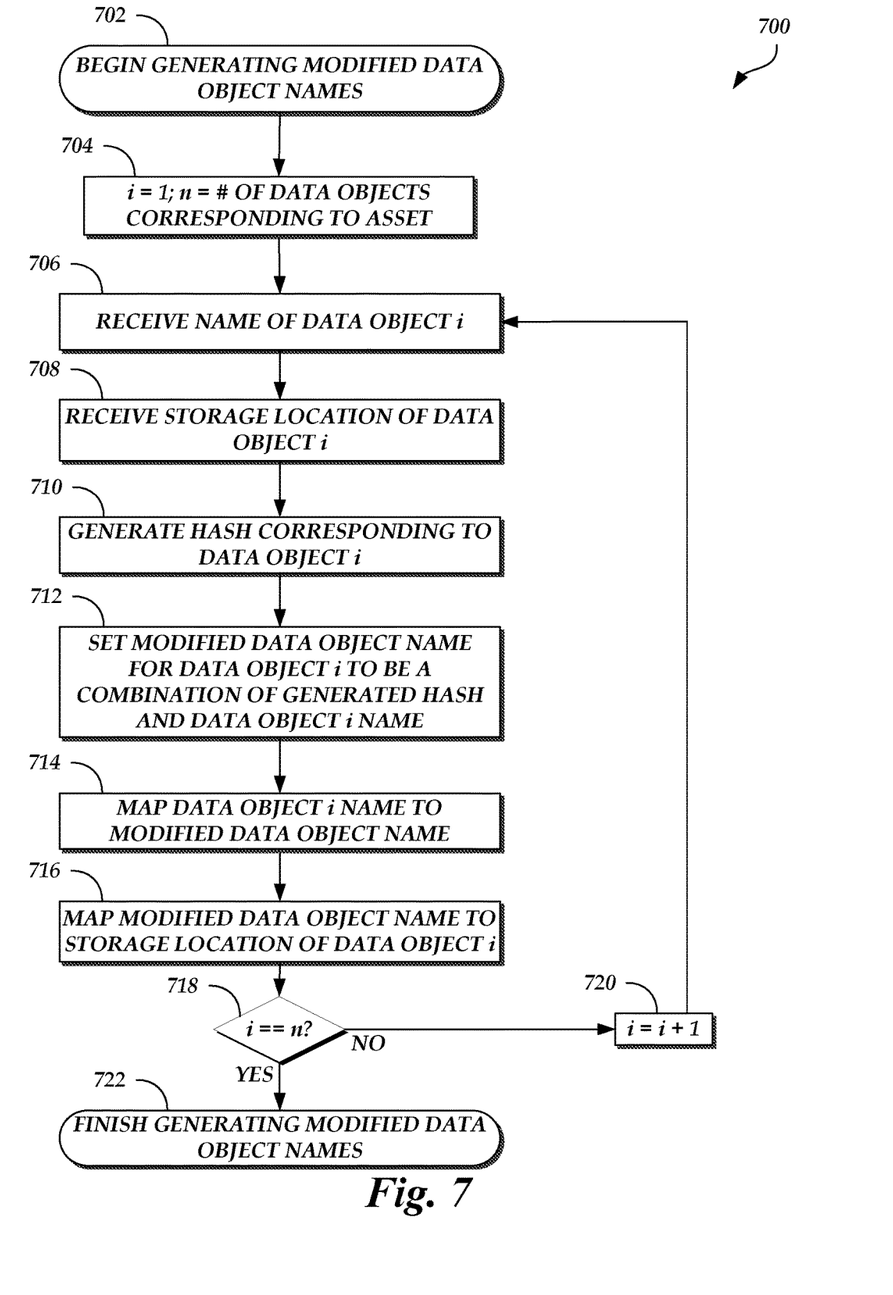
FIG. 7 is a flow diagram depicting a routine for generating modified data object names illustratively implemented by an asset storage server, according to one embodiment.

FIG. 7 is a flow diagram depicting a modified data object name generation routine 700 illustratively implemented by an asset storage server, according to one embodiment. As an example, the asset storage server 106 of FIG. 1 can be configured to execute the modified data object name generation routine 700. The modified data object name generation routine 700 begins at block 702.

At block 704, variable i is set equal to 1 and variable n is set equal to the number of data objects corresponding to an asset name. For example, the asset owner device 104 may indicate that a plurality of related data objects will be stored in the asset database 144, where each of the related data objects can be classified within the asset name.

At block 706, a name of data object i is received. For example, the name of data object i may be the name provided by an asset owner.

At block 708, a storage location of data object i is received. For example, storage location may be the file path of data object i, which indicates the location in the asset database 144 where data object i is stored.

At block 710, a hash corresponding to data object i is generated. For example, the hash may be generated using the file path of data object i. SHA-256 or other similar techniques may be used to complete the hash function.

At block 712, the modified data object name for data object i is set to be a combination of the generated hash and the name of data object i. For example, the generated hash value may be appended as a prefix to the name of data object i to form the modified data object name. In alternate embodiments, the modified data object name for data object i can be set to a randomized reordering of the characters in the name of data object i.

At block 714, the original name of data object i is mapped to the modified data object name. For example, the lookup key generator 126 can store this mapping in the lookup key database 146.

At block 716, the modified data object name is mapped to the storage location of data object i. For example, the lookup key generator 126 can store this mapping in the lookup key database 146 such that the lookup key database 146 is indexed using the modified data object name.

At block 718, a determination is made as to whether the variable i equals the variable n. If the two variables are equal, this indicates that all data objects to be stored in the asset database 144 have been processed and the modified data object name generation routine 700 may be complete, as shown in block 722. Otherwise, all data objects to be stored in the asset database 144 have not been processed and the modified data object name generation routine 700 proceeds to block 720.

At block 720, variable i is incremented by 1. After block 720 is complete, the modified data object name generation routine 700 proceeds back to block 706 and repeats blocks 706 through 718 until all data objects are processed.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
    as implemented by one or more computing devices configured with specific executable instructions,
        receiving data associated with a first media object and a second media object to be stored, wherein the received data comprises a name of the first media object, an indication of an asset name to which the first media object is associated, a name of the second media object, an indication of the asset name to which the second media object is associated, and a set of permissions to assign the asset name, and wherein the first media object and the second media object are associated with the same content and have names in a different format;
        mapping the name of the first media object to the asset name and the name of the second media object to the asset name;
        mapping the set of permissions to the asset name;
        storing the mapping of the name of the first media object to the asset name and the mapping of the name of the second media object to the asset name in an asset permissions data store such that a batch operation can be performed on the first media object and the second media object using the asset name;
        storing the mapping of the set of permissions to the asset name in the asset permissions data store;
        receiving a request from a user device to access the first media object;
        querying, using the name of the first media object, the asset permissions data store to identify that the asset name is mapped to the name of the first media object;
        querying, using the asset name, the asset permissions data store to retrieve the set of permissions mapped to the asset name;
        determining that a user associated with the user device is authorized to access the first media object based on the retrieved set of permissions;
        retrieving the first media object from an asset data store; and
        transmitting the first media object to the user device to satisfy the request.

2. The computer-implemented method of claim 1 further comprising:
    receiving a second request from an asset owner device to modify permissions of the asset name based on a second set of permissions;
    mapping the asset name to the second set of permissions; and
    storing the mapping of the asset name to the second set of permissions in the asset permissions data store.

3. The computer-implemented method of claim 1, wherein the first media object comprises one of a movie file, a television show file, a music video file, or an audio book file.

4. A system comprising:
    an asset permissions data store configured to identify permissions associated with a first media object and a second media object; and
    an asset storage system comprising a processor and memory, wherein the memory includes instructions that, when executed by the processor, cause the asset storage system to:
        receive data associated with the first media object and the second media object, wherein the received data comprises a name of the first media object, a name of the second media object, an indication of an asset name to which the first media object and the second media object are associated, and a set of permissions to assign the asset name, and wherein the first media object and the second media object are associated with the same content and have names in a different format;
        map the name of the first media object and the name of the second media object to the asset name;
        map the set of permissions to the asset name;
        store the mapping of the name of the first media object to the asset name and the mapping of the name of the second media object to the asset name such that a batch operation can be performed on the first media object and the second media object using the asset name; and
        store the mapping of the set of permissions to the asset name,
        wherein storage of the mapping of the name of the first media object to the asset name and of the mapping of the set of permissions to the asset name causes the set of permissions to govern access to the first media object.

5. The system of claim 4 further comprising an asset retrieval server, wherein second instructions, when executed, cause the asset retrieval server to:
    receive a request from a user device to access the first media object;
    query, using the name of the first media object, the asset permissions data store to identify that the asset name is mapped to the name of the first media object;
    query, using the asset name, the asset permissions data store to retrieve the set of permissions mapped to the asset name;
    determine that a user associated with the user device is authorized to access the media object;
    retrieve the first media object; and
    transmit the first media object to the user device to satisfy the request.

6. The system of claim 4, wherein the instructions, when executed by the processor, further cause the asset storage system to:
    receive a second request from an asset owner device to modify permissions of the asset name based on a second set of permissions;
    map the asset name to the second set of permissions; and
    store the mapping of the asset name to the second set of permissions.

7. The system of claim 6, wherein the second request comprises a time parameter that indicates an expiration of the second set of permissions.

8. The system of claim 4, wherein the instructions, when executed by the processor, further cause the asset storage system to update permissions of the asset name in response to an occurrence of an event.

9. The system of claim 8, wherein the event comprises one of storage of a third media object, an expiration of the set of permissions, or a modification of the first media object.

10. The system of claim 4, wherein the instructions, when executed by the processor, further cause the asset storage system to execute a second batch operation to move the first media object, the second media object, and any other media object mapped to the asset name from a first storage tier to a second storage tier.

11. The system of claim 4, wherein the first media object comprises one of a movie file, a television show file, a music video file, or an audio book file.

12. The system of claim 4, wherein the set of permissions comprises at least one of read access granted to the user, write access granted to the user, delete access granted to the user, or update metadata access granted to the user.

13. A non-transitory computer-readable medium having stored thereon executable program code that directs one or more computing devices to perform operations when executed, the operations comprising:

receiving data associated with a first media object and a second media object, wherein the received data comprises a name of the first media object, a name of the second media object, and an indication of an asset name to which the first media object and second media object are associated, and wherein the first media object and the second media object are associated with the same content and have names in a different format;

mapping the name of the first media object and the name of the second media object to the asset name;

mapping a default set of permissions to the asset name in response to a determination that the received data does not indicate any permission set;

storing the mapping of the name of the first media object to the asset name and the mapping of the second media object to the asset name such that a batch operation can be performed on the first media object and the second media object using the asset name; and storing the mapping of the default set of permissions to the asset name, wherein storage of the mapping of the name of the first media object to the asset name and of the mapping of the default set of permissions to the asset name causes the default set of permissions to govern access to the first media object.

14. The non-transitory computer-readable medium of claim 13, wherein the operations further comprise:

receiving a second request to modify permissions of the asset name based on a second set of permissions;

mapping the asset name to the second set of permissions; and storing the mapping of the asset name to the second set of permissions.

15. The non-transitory computer-readable medium of claim 14, wherein the second request comprises a time parameter that indicates an expiration of the second set of permissions.

16. The non-transitory computer-readable medium of claim 13, wherein the operations further comprise updating permissions of the asset name in response to an occurrence of an event.

17. The non-transitory computer-readable medium of claim 16, wherein the event comprises one of storage of a third media object, an expiration of the set of permissions, or a modification of the first media object.

18. The non-transitory computer-readable medium of claim 13, wherein the operations further comprise executing a second batch operation to move the first media object, the second media object, and any other media object mapped to the asset name from a first storage tier to a second storage tier.

19. The non-transitory computer-readable medium of claim 13, wherein the first media object comprises one of a movie file, a television show file, a music video file, or an audio book file.

20. The non-transitory computer-readable medium of claim 13, wherein the default set of permissions comprises at least one of read access granted to a user, write access granted to the user, delete access granted to the user, or update metadata access granted to the user.

* * * * *